United States Patent [19]

Anderson

[11] E Re. 30,875

[45] Reissued Mar. 2, 1982

[54] FOOT OPERATED CONTAINER AND CLOSURE DEVICE

[75] Inventor: Howard A. Anderson, Pittsburgh, Pa.

[73] Assignee: Cities Service Company, Tulsa, Okla.

[21] Appl. No.: 142,950

[22] Filed: Apr. 23, 1980

Related U.S. Patent Documents

Reissue of:

[64] Patent No.: 4,150,764
Issued: Apr. 24, 1979
Appl. No.: 933,397
Filed: Aug. 14, 1978

[51] Int. Cl.[3] ..... B65D 43/26

[52] U.S. Cl. ..... 220/263; 220/1 T; 220/334; 220/262

[58] Field of Search ..... 220/1 T, 260, 262, 263, 220/264, 334, 337

[56] References Cited

U.S. PATENT DOCUMENTS

| | | | |
|---|---|---|---|
| 1,828,741 | 10/1931 | Sauvage | 220/263 |
| 2,419,163 | 4/1947 | Pope | 220/1 T X |
| 2,593,455 | 4/1952 | James | 220/263 X |
| 3,860,141 | 1/1975 | Hawk | 220/1 T X |

FOREIGN PATENT DOCUMENTS

| | | | |
|---|---|---|---|
| 97225 | 1/1923 | Switzerland | 220/262 |

*Primary Examiner*—George T. Hall
*Attorney, Agent, or Firm*—Donald L. Traut; Walter M. Benjamin

[57] ABSTRACT

A receptacle device useful for receiving material, comprising a container having an open end, a closure or lid detachably and pivotally mounted on the open end of the container and an operating member connected to the closure so that the closure can be raised to and from a closed position in response to operation of the operating member.

8 Claims, 6 Drawing Figures

FIG. 1
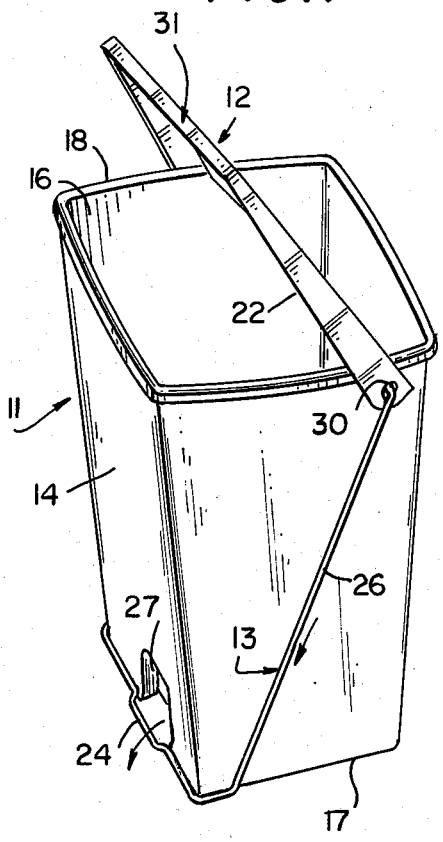
FIG. 2
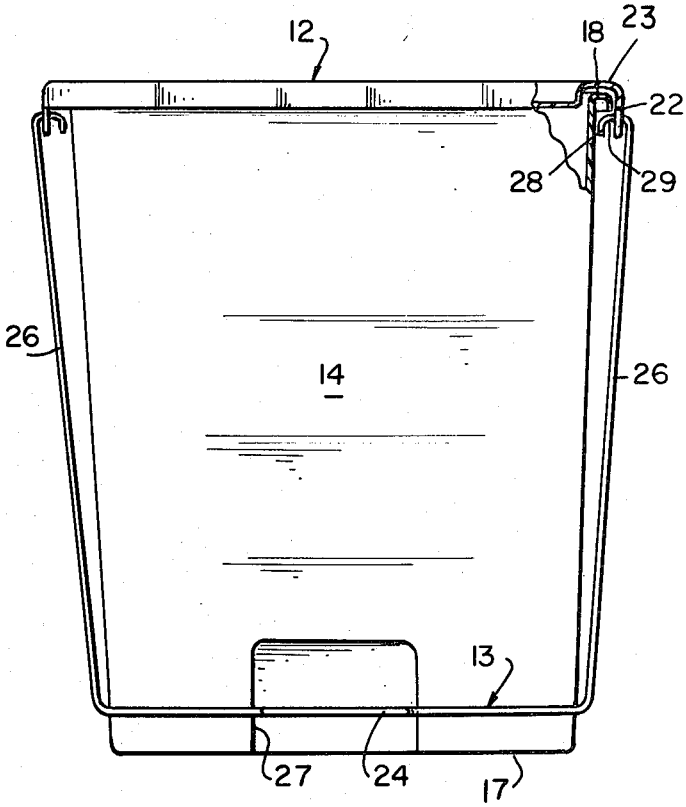
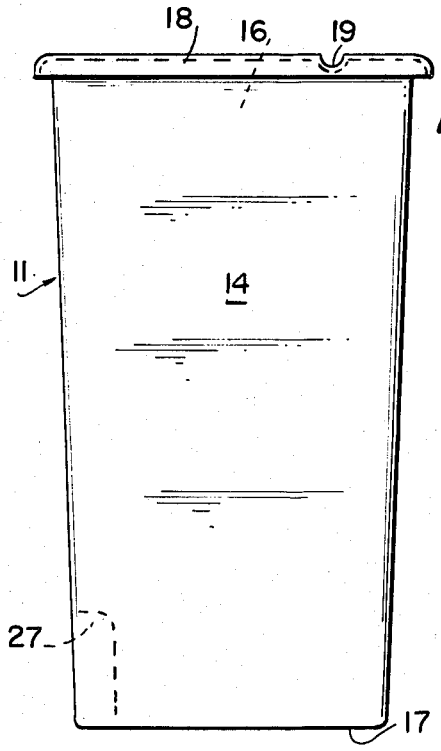
FIG. 3
FIG. 4
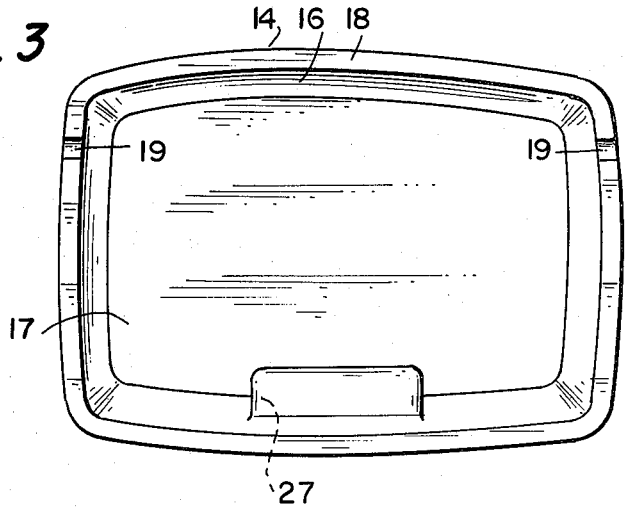

FIG. 5
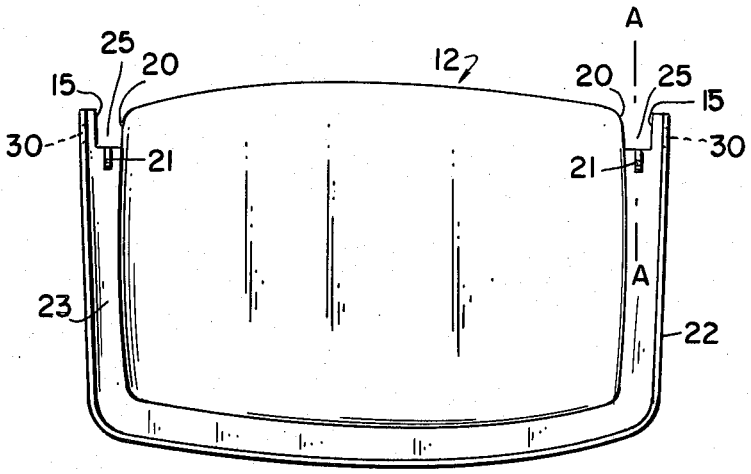
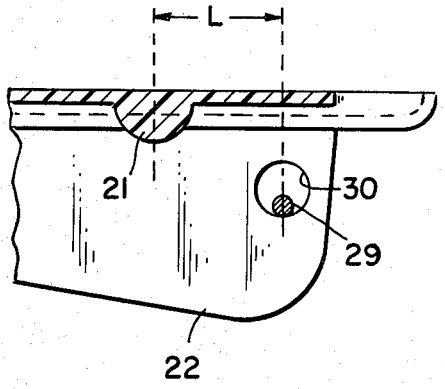
FIG. 6

FOOT OPERATED CONTAINER AND CLOSURE DEVICE

Matter enclosed in heavy brackets [ ] appears in the original patent but forms no part of this reissue specification; matter printed in italics indicates the additions made by reissue.

BACKGROUND OF THE INVENTION

The present invention relates to receptacles for containing liquid and solid materials including an open container, a closure detachably and pivotally mounted on the open container and an operating member connected to the closure for moving the closure relating to the container.

The receptacle is readily separable into its component parts for convenient and economical packaging and shipping. Correspondingly, the receptacle can be readily assembled manually in the field.

PRIOR ART

Typical prior art receptacle devices of the class within which the present invention falls are disclosed and described in U.S. Pat. Nos. 3,450,297 to Clerk, 1,251,984 to Losoncy, 1,828,741 to Sauvage and 2,419,163 to Pope, class no. 220-36.

Clerk, Losoncy and Pope disclose a container, a closure for the open end of the container, a rod and a pedal. The closure is pivotally mounted upon the container. The pedal is connected to the closure by the rod. In the operation of these devices, the pedal is depressed to pull the rod downward which in turn pulls the connected edge of the closure downward to tilt the closure about its pivotal axis, thereby opening the container.

The most pertinent prior art is Sauvage which discloses a container, a detachable pivotally mounted closure for the open end of the container, a ball and an operating means. The operating member consists of a single rod attached to the cover, the member formed at its lower end to provide a pedal. The bail additionally functions as a guide for the operating member. The closure is formed with a hinge and a movable butt. The container is fitted with a socket member which is formed to receive the movable butt. To remove the closure from the container, the movable butt is moved upward to disengage it from the socket member.

The prior art device of Sauvage uses a hinge to keep the closure in register with the container. In addition, the method of manufacture of the Sauvage device is complex and the product does not lend itself to being a stackable item.

SUMMARY OF THE INVENTION

In contrast to the above prior art, this present invention contemplates a container having an open end, a closure detachably and pivotally mounted on the open end of the container and an operating member connected to the closure so that the closure can be raised to and from a closed position in response to the depression of the operating member.

The present invention has for an object to provide a receptacle which has only three formable piece parts which can be assembled and separated manually.

A further object of the invention is to provide a receptacle having parts which are stackable for ease in shipment.

A still further object of the invention is to provide a receptable having a closure which is readily separable manually and intentionally from the container so that the contents of the container can be removed.

A still further object of the invention is to provide a receptacle having a closure which cannot be separable inadvertently.

According to the present invention, a three element receptacle for receiving material includes a container, a closure and an operating member, the elements being manually separable, the container having an opening formed with a continuous peripheral beaded rim, the continuity of the rim being interrupted by a pair of opposed depressions defining bearings, the closure carrying arcuate tabs mating with and rotatable within the bearings, the closure being further formed with a channel operable to mate with the beaded rim to keep the closure in register when the closure is the closed position, the closure being still further formed with slots operable to mate with the beaded rim to keep the closure in register with the closure is in the open position, the operating member being formed with a treadle and removably and rotatably mounted to the closure at a location spaced from the arcuate tabs effective to develop a lever arm so that upon operation of the treadle, the closure is pivoted from a closed position to an open position.

BRIEF DESCRIPTION OF THE DRAWING

Other features and advantages of the present invention will become more apparent from an examination of the following specification when read in conjunction with the appended drawings, in which:

FIG. 1 is a perspective view showing the receptacle according to one embodiment of the invention, the closure being shown in the raised or open position and the treadle being fully depressed.

FIG. 2 is a front view of the receptacle device with the closure in the lowered or closed position and the operating member in the normal position and a fragmentary view of one cover of the container and closure showing a beaded rim of the container and a bridge and return which terminates operating member.

FIG. 3 is a side view of the container showing the depressions in the beaded rim.

FIG. 4 is a top view of the container showing the depressions in the beaded rim.

FIG. 5 is a bottom plain view of the closure showing the arcuate tabs operable to rotate lid on the container and the channel operable to keep the closure in register with the container.

FIG. 6 is an expanded fragmentary section on the line A—A in FIG. 5, showing the arcuate tabs on the closure.

DETAILED DESCRIPTION OF THE DRAWINGS

Referring now in detail to the drawings, particularly FIG. 1, the receptacle, indicated generally by reference numeral 11, includes an open container 14, closure or lid indicated generally by reference numeral 12 and an operating member indicated generally by reference numeral 13.

The container 14 includes an open end 16 and a bottom 17. The cross-sectional area of the open end 16 is larger than the bottom 17 to facilitate telescoping a plurality of containers for shipment.

Referring to FIGS. 1, 2, 3 and 4, the open end 16 of the container 14, has a beaded rim 18 defining an inverted U-shape in cross-section as is most apparent in the fragmentary section of FIG. 2. The beaded rim 18 is interrupted by a pair of opposed depressions defining bearings 19—19, which cooperate with the closure 12 in a manner to be described hereinafter.

Referring to FIGS. 3, 4, 5 and 6, the closure 12 is adapted to cover the open end 16 of the container 14. Additionally, a margin 22 of the closure is formed with arcuate tabs 21—21 which mate with and are rotable within the bearings 19—19. The margin 22 is also formed with a peripheral channel 23 which receives the beaded rim 18 of the container 14 when the closure 12 is in the closed position as is apparent in FIG. 2. The channel 23 co-operates with the beaded rim 18 when the closure is in the closed position to maintain the arcuate tabs 21—21 in register with the bearings 19—19.

The channel 23 is formed with slots 25—25 which are adjacent to arcuate tabs 21—21 and have sidewalls 15—15 and 20—20 operable to straddle the beaded rim 18 of the container 14 to maintain the arcuate tabs 21—21 in register with the bearings 19—19 during the opening and closing operation of closure 12.

The margin 22 of the closure 12 is formed with a pair of opposed apertures 30—30 for receiving arms 26—26 of the operating member 13. The arms 26—26 terminate in return bends 28—28 which are spaced from arm 26—26 by bridges 29—29 to effect a separable, rotatable connection between the operating arms 26—26 and the closure 12 (see FIG. 2).

Alternatively, the margin 22 of the closure 12 in the region of the apertures 30—30 is formed with a pair of inwardly projecting brigs (not shown) of sufficient length to register with and bear against the beaded rim 18 of the container 14 when the closure 12 is in the open position.

Referring in detail to FIGS. 1, 2 and 6, the operating member 13 is of a U-shaped configuration generally straddling the container 14, and includes a treadle 24 centrally disposed relatively to the arms 26—26. Correspondingly, the container 14 is formed with a recess 27 to facilitate operation of the treadle.

The container and closure can be made of the same or different materials. For example, both can be made from plastic or metal or one can be of plastic and the other being metal. The operating member of the present invention can be made of plastic or metal. Preferrably the member is formed of metal.

Note that the apertures 30—30, formed in the margin 22, must be so disposed relative to the bearings 19—19 and cooperating arcuate tabs 21—21 to develop a lever arm, such as indicated by the letter L in FIG. 6, effective to create sufficient mechanical advantage when the treadle 24 is depressed in the direction shown by the arrow of FIG. 1 to raise the closure to the open position.

The receptacle device of the present invention operates in the following fashion: with the device in the closed position as shown in FIG. 2, depression of treadle 24 is effective to raise closure 12 to the open position as shown in FIG. 1. Release of the treadle permits closure 12 to return to the closed position in response to gravity.

Note that when the closure 12 is in the open position, it is possible to grasp the closure manually along the margin indicated by the reference numeral 31 permitting one to lift the complete receptacle without separating the closure 12 from the container 14 in that bridges 29—29 are lifted into contact with beaded rim 18 precluding separation of the closure and the container.

This structure and function permits one to transport the receptacle as a unit conveniently.

Obviously, the three basic elements, namely closure 12, container 14 and operating member 13, are manually separable and readily assembled as shipping, display and use requirements dictate.

It is anticipated that a wide variety of modification and design changes can be developed without departing from the spirit of the scope of the invention.

What is claimed is:

1. A three element receptacle for receiving material comprising: a *stackable* container [,] *having an opening;* a closure *pivotally and detachably mounted on the opening;* and [an] *a substantially U-shaped* operating member [, said elements being manually separable, said container having an opening formed with a continuous peripheral beaded rim, the continuity of said rim being interrupted by a pair of opposed depressions defining bearings, said closure carrying arcuate tabs mating with and rotatable within said bearings, said closure being further formed with a channel operable to mate with said beaded rim to keep said closure in register when said closure is in the closed position, said closure being still further formed with slots operable to mate with said beaded rim to keep said closure in register when said closure is in the open position, said operating member being formed with a treadle and removable and rotatably mounted to said closure at a location spaced from said arcuate tabs effective to develop a lever arm so that upon operation of said treadle, said closure is pivoted from a closed position to an open position.] *straddling the container and being rotatably mounted on the closure; wherein the walls of the container which define the opening has a bearing surface upon which the closure is pivoted; wherein the closure has an element which mates with the bearing surface when the closure is pivoted; and wherein the operating member can be actuated to cause the closure to pivot on the bearing surface to open and/or close the container.*

2. The receptacle of claim 1 wherein [said operating member has a U-shaped configuration and straddles said container.] *the opening is formed with a continuous peripheral beaded rim, the continuity of the rim being interrupted by a pair of opposed depressions defining the bearing surface.*

3. The receptacle of claim 1 wherein [said container is formed with a recess in register with said treadle.] *the closure carries arcuate tabs mating with and rotatable within the bearing surface.*

4. The receptacle of claim 1 wherein [said operating member and said closure are so constructed so that said operating member or closure registers and bears against said beaded rim when said closure is in the open position, thereby operating to prevent said lid from disengaging from said container.] *the closure is further formed with a channel operable to mate with the opening to keep said closure in register when said closure is in the closed position.*

5. The receptacle of claim 1 wherein said operating member is formed with a [pair of opposed bridges operable to register and bear against said beaded rim when said closure is in the open position whereby said closure may be grasped and said receptacle transported without separating said closure from said container.]

*tradle and wherein the container is formed with a recess in register with the treadle.*

6. The [device] *receptacle*of claim [5] *6* wherein [said bridges terminate in return bends effective to avoid inadvertent separation between said operating arms and said closure.] *the operating member and the closure are so constructed so that the operating member or closure registers and bears against said beaded rim when the closure is in the open position, thereby operating to prevent said lid from disengaging from the container.*

7. The [device] *receptacle* of claim [1] *2* wherein [said closure] *the operating member* is formed with [inward tabs operable to register] *a pair of opposed bridges operable to register* and bear against [said] *the* beaded rim when said closure is in the open position whereby said closure may be grasped and said receptacle transported without separating said closure from said container[.] *, and wherein the bridges terminate in return bends effective to avoid inadvertent separation between the operating member and the closure.*

*8. The receptacle of claim 2 wherein the closure is formed with inward tabs operable to register and bear against the beaded rim when the closure is in the open position whereby the closure may be grasped and the receptacle transported without separating the closure from the container.*

* * * * *